(No Model.)
D. C. MILLER.
STONE SAW.
No. 500,592. Patented July 4, 1893.
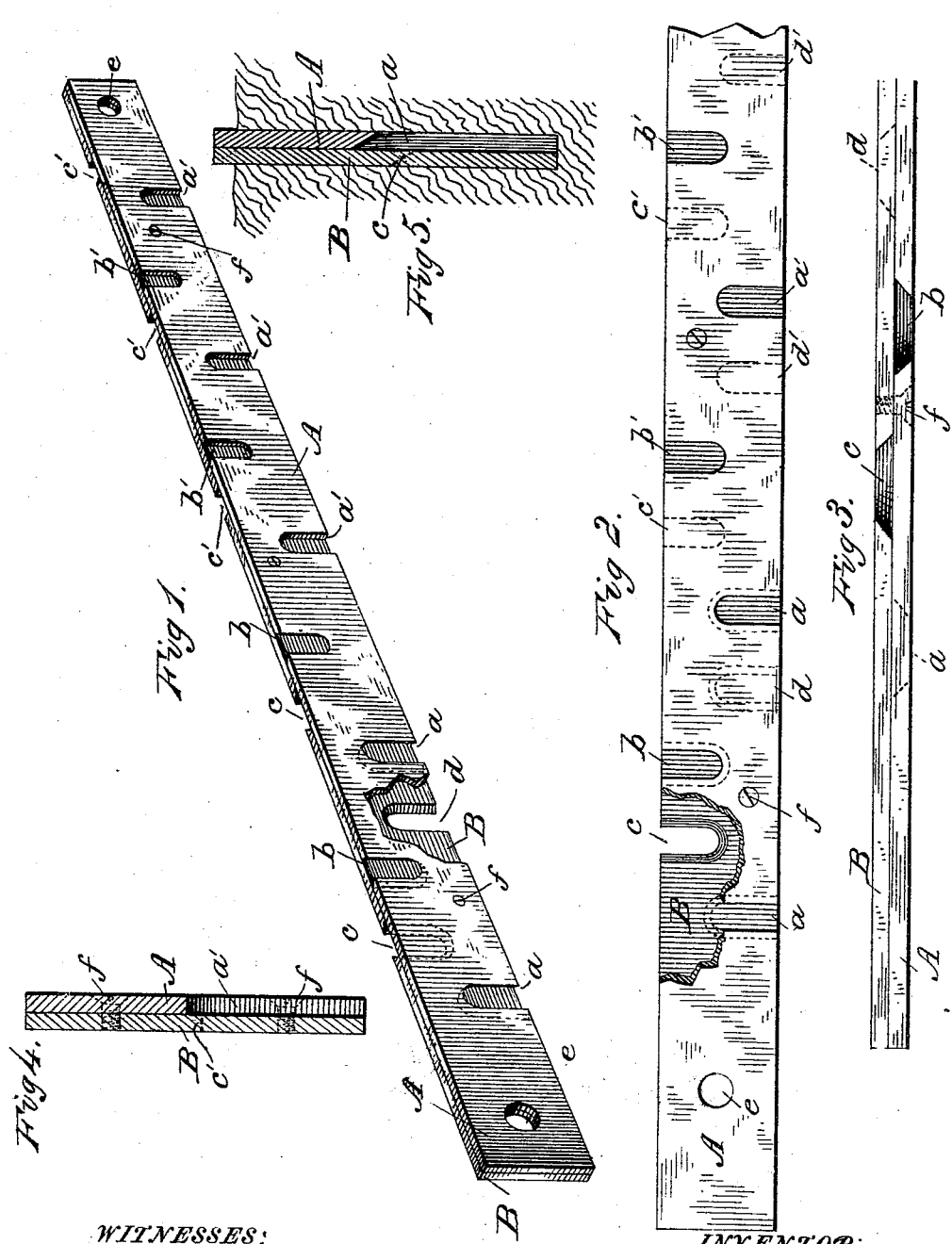
WITNESSES:
Harry King
Martin Heermance
INVENTOR:
David C. Miller
By King & King, Attorney.

UNITED STATES PATENT OFFICE.

DAVID C. MILLER, OF NEWBURG, NEW YORK.

STONE-SAW.

SPECIFICATION forming part of Letters Patent No. 500,592, dated July 4, 1893.

Application filed January 3, 1893. Serial No. 457,069. (No model.)

*To all whom it may concern:*

Be it known that I, DAVID C. MILLER, a citizen of the United States, residing at Newburg, in the county of Orange and State of New York, have invented certain new and useful Improvements in Stone-Saws; and I do hereby declare the following to be a full, clear, and exact description of the invention, such as will enable others skilled in the art to which it appertains to make and use the same.

My invention relates to improvements in stone-saws in which the metal blades are provided with recesses extending to the cutting edges; and the objects of my improvements are, first, to facilitate the feeding of the sand or other cutting material into the kerf by means of recesses formed as hereinafter described; second, to construct such recesses in a manner not tending to render the blade likely to break, or to wear away unevenly, and third, to obtain these advantages with greatest efficiency and least expense by the union of two strips of recessed metal in one cutting blade. I attain these objects by the device illustrated in the accompanying drawings, in which Figure 1, is a perspective view of my saw blade, showing both beveled and squared edge recesses, a portion of one strip of metal being broken away to better show the construction. Fig. 2 is a side elevation of a portion of the same blade somewhat enlarged, showing by dotted lines the location of the recesses in the opposite strip of metal. Fig. 3, is an enlarged edge view of that portion of the blade containing the beveled edge recesses. Fig. 4, is a vertical cross section of the blade showing the location and form of the squared edge recesses; and Fig. 5, is a similar view showing the position and shape of the beveled edge recesses.

Similar letters refer to similar parts throughout the several views.

A and B represent strips of metal of the ordinary length and width used for sawing stone, and of one-half the usual thickness, so that when placed together they make a cutting blade of the size best adapted to the work. In each strip I form recesses *a, b, c, d,* having beveled edges, or similar recesses *a', b', c', d',* having squared edges. These recesses extend from one edge of the blade about half way toward the other edge, preferably a little beyond the center, leaving the metal of full thickness from the inner point of the recess to the opposite edge of the blade, thus making a stronger blade than is possible where grooves extend completely across from edge to edge. The strength of the cutting blade is still further increased in my device by locating the recesses in one strip opposite the solid portion of the other strip intervening between its corresponding recesses, and by fastening together, with their recesses in this position, the strips A and B, by any suitable means, represented in the drawings by the rivets or screws *f, f.* The holes *e, e,* passing through A and B at each end, serve as means of attaching the blade to the saw frame in the usual manner. The recesses are preferably far enough apart on each edge to permit of constructing them on both edges of the saw blade, so that the saw may be reversed and used with the same effect.

It will readily be seen that the above described method of constructing a stone saw while not weakening the blade, as the usual notches or grooves have tended to do, affords several marked advantages over the ordinary, plain cutting blade, or the notched, grooved, or toothed blades which have been devised to aid in feeding the sand into the kerf.

In my device the sand used for abrasion will pass freely down the recesses on the upper edge of the blade as far as the center and as it is washed into the kerf the recesses on the lower or cutting edge feed the smaller, uniform sand grains under the blade, and the upper recesses retain the larger, coarse grains which ordinarily tend to hinder the action of the blade and to make jagged cuttings in the stone. Whereas in the blades constructed with grooves extending from edge to edge the sand may be washed back and forth without being forced under the cutting edge of the saw, and the coarse grains gather with the finer grains of the abrading material into the kerf. So also, in my device, the sand is gathered in the recesses, and from them crowded under the cutting edge of the blade by the continuous supply of sand being fed into the kerf, instead of being washed from side to side, as happens where the notches extend completely through the saw blade.

My device might be made from a single strip of metal, and accomplish the above described results, but by constructing my blade of two strips of metal, each of about one-half the usual thickness of the ordinary saw blade, I gain the further advantages of decreasing the expense of making the squared edge recesses $a'$, $b'$, $c'$, $d'$, and of affording an opportunity to form the beveled edge recesses $a$, $b$, $c$, $d$, which are preferable because they more readily catch and retain the larger grains of sand, and more surely feed the abrading material directly under the center of the blade, and under the longitudinal joint between the strips A and B, which joint constitutes a channel or guide for retaining the sand under the blade, and also for catching up and retaining any particles of chilled iron, crushed steel or other material used for abrasion; and these particles of grit, held in place by the joint between A and B, will continue to cut away the stone at times when the feeding of fresh abrading material is, from various causes, not continuous or regular; thus tending to prevent the uneven wearing, called burning, of the saw blade.

Having thus described my invention, what I claim, and desire to secure by Letters Patent, is—

A stone saw consisting of two blades fastened together each having recesses on each edge alternating with each other and extending part-way from edge to edge and the recesses in one blade alternating with those of the other blade, substantially as specified.

In testimony whereof I affix my signature in presence of two witnesses.

DAVID C. MILLER.

Witnesses:
MARTIN HEERMANCE,
IRVING ELTING.